(12) United States Patent
Remmert et al.

(10) Patent No.: US 7,209,343 B2
(45) Date of Patent: Apr. 24, 2007

(54) ADJUSTABLE RISER AND PANEL BOARD INCORPORATING SAME

(75) Inventors: Scot E. Remmert, Mt. Pulaski, IL (US); Matthew D. Occhipinti, East Peoria, IL (US); Julie C. Jurgens, Bloomington, IL (US)

(73) Assignee: Eaton Corporation, Cleveland, OH (US)

( * ) Notice: Subject to any disclaimer, the term of this patent is extended or adjusted under 35 U.S.C. 154(b) by 330 days.

(21) Appl. No.: 10/913,210

(22) Filed: Aug. 6, 2004

(65) Prior Publication Data

US 2006/0028789 A1 Feb. 9, 2006

(51) Int. Cl.
*H02B 1/04* (2006.01)

(52) U.S. Cl. .................. 361/634; 361/644; 361/652; 361/673

(58) Field of Classification Search ........ 361/627–628, 361/634, 644, 645, 647, 652–653, 673
See application file for complete search history.

(56) References Cited

U.S. PATENT DOCUMENTS 3,786,313 A * 1/1974 Coles et al. .............. 361/644
4,720,769 A * 1/1988 Raabe et al. ............. 361/634
4,783,718 A 11/1988 Raabe et al.
5,745,337 A 4/1998 Reiner
6,570,754 B2 5/2003 Foley et al.

* cited by examiner

*Primary Examiner*—Greg Thompson
(74) *Attorney, Agent, or Firm*—Martin J. Moran

(57) ABSTRACT

An adjustable riser assembly for retrofitting an existing panel board enclosure with a replacement interior has a pair of base members secured to the rear wall of the enclosure with base flanges projecting forward. A floating member has end pieces with floating flanges that overlap and are joined to the base flanges by fasteners that engage selected ones of a second set of holes in each floating flange aligned along a first linear axis and a first set of holes in each base flange arranged in two rows each parallel to a second linear axis that is oblique to the first linear axis to adjust the height of the riser assembly. One or two planar members extending between the end pieces have a fourth set of holes that can be selectively aligned with a third set of holes in the end pieces for engagement by second fasteners to adjust the length of the riser assembly.

15 Claims, 4 Drawing Sheets

ADJUSTABLE RISER AND PANEL BOARD INCORPORATING SAME

BACKGROUND OF THE INVENTION

1. Field of the Invention

This invention relates to panel boards for electric power distribution systems and to a riser assembly with an adjustable height and length to accommodate panel board enclosures with a range of depths and panel board interiors with a range of lengths.

2. Background Information

The circuit breakers for branch circuits at sites served by an electric power distribution system are typically collectively housed in a panel board, control center or load center, with the first two designations commonly used for units designed to meet the heavier service requirements of industrial and commercial installations while the latter term is used for residential and light commercial applications. As the main difference between panel boards, control panels and load centers is the service rating, only the term "panel board" will be used throughout for convenience, but will be understood to also embrace control panels and load centers as well.

The typical panel board has an enclosure in which the circuit breakers are mounted on what is known in the industry as an interior. The interior comprises one or more distribution buses and a structure mechanically supporting the circuit breakers and electrically connecting them to one or more of the distribution buses. Separate neutral buses and ground bars are also mounted in the enclosure.

The enclosure has a rear wall, side walls, and a dead front with openings in which the circuit breaker's register for manual operation. A hinged door normally covers the dead front. The interior is mounted to the rear wall on a riser sized to position the circuit breakers in the dead front openings taking into account the depth of the enclosure. The panel board enclosure is usually mounted on a wall or is recessed in a wall so that the front is substantially flush with the wall surface.

In replacing or updating electrical service provided by older panel boards, it has been found that in many cases the replacement equipment providing the same or expanded service is physically smaller than the prior equipment. On the other hand, the enclosures are usually still adequate, and in the case of recessed panel boards would require wall repairs to remove and replace.

Retrofitting old enclosures with new interiors and circuit breakers has required shimming up the replacement interior or fabricating new risers to bring the new smaller circuit breakers into registry with the dead fronts. The latter practice requires the contractor to supply measurements of the existing enclosure, which are often not accurate and/or not timely provided. Also, in some retrofits, additional branch circuit breakers are added requiring a longer interior, yet one that can still fit within the original enclosure.

There is a need therefore, for a riser and a panel board enclosing such a riser that can be adjusted in the field in height and/or in depth to retrofit an existing panel board enclosure with a replacement or expanded interior.

SUMMARY OF THE INVENTION

In accordance with aspects of the invention, a riser assembly has an adjustable height to accommodate the range of depths of an enclosure so that the circuit breakers mounted on the panel board interior register with the dead front of the enclosure. More particularly, an aspect of the invention is directed to a panel board comprising: an enclosure having a rear wall and a dead front with circuit breaker openings positioned at a range of depths from the rear wall; an interior having a range of lengths; circuit breakers mounted on a front of the interior; and an adjustable riser assembly secured to the rear wall of the enclosure and on which the interior is mounted. The adjustable riser assembly has a selected height adjustable to position the circuit breakers in registration in the circuit breaker openings in the dead front over the range of depths of the enclosure. In accordance with another aspect of the invention, the adjustable riser assembly has means for selectively setting the length of the riser assembly to a selected length to accommodate a range of lengths of the interior.

More particular, the adjustable riser assembly can comprise a pair of spaced apart base members secured to the rear wall of the enclosure and each having a base projection extending outward from the rear wall of the enclosure and having a first set of holes. The adjustable riser can further include a floating member having a pair of floating projections, one at each end projecting toward the rear wall of the enclosure and having a second set of holes. The first and second sets of holes can be positioned so that with the base projections and floating projections selectively overlapping, selected holes of the first sets of holes and of the second sets of holes can be aligned for engagement by first fasteners to establish the selected height of the riser assembly. The base members can each comprises a first flange secured flat against the rear wall of the enclosure and a second flange comprising the base projection perpendicular to and joined along a common first edge to the first flange. One of the first and second sets of holes can comprise a first plurality of holes aligned along a first linear axis and the other can comprise a second plurality of holes along at least one second liner axis that is oblique to the first linear axis. The other first and second sets of holes can comprise a second plurality of holes aligned in two rows each parallel to the second linear axis and staggered in the direction of height of the riser assembly to provide a substantially continuous adjustment of the riser height.

The floating member of the adjustable riser assembly can comprise a pair of end pieces each having a third flange forming one of the floating projections, and a planar extension extending substantially perpendicular to and joined along a second common edge to the third flange. In this embodiment of the floating member, at least one planar member extends between the planar extensions on the end pieces and second fasteners secure the at least one planar member to the end pieces to set the selected length of the riser assembly. The planar extensions on the end pieces of the floating member can have third sets of holes and the at least one planar member can have a fourth set of holes so with the at least one planar member selectively overlapping the planar extensions on the end pieces with selected holes of the third sets of holes aligned with selected holes of the fourth set of holes for engagement by second fasteners to set the selected length of the floating member to accommodate for different lengths of interiors. In one embodiment of the invention, the at least one planar member can comprise a pair of planar members extending between the two end pieces of the floating member.

BRIEF DESCRIPTION OF THE DRAWINGS

A full understanding of the invention can be gained from the following description of the preferred embodiments when read in conjunction with the accompanying drawings in which.

DESCRIPTION OF THE PREFERRED EMBODIMENTS

Figure 1:
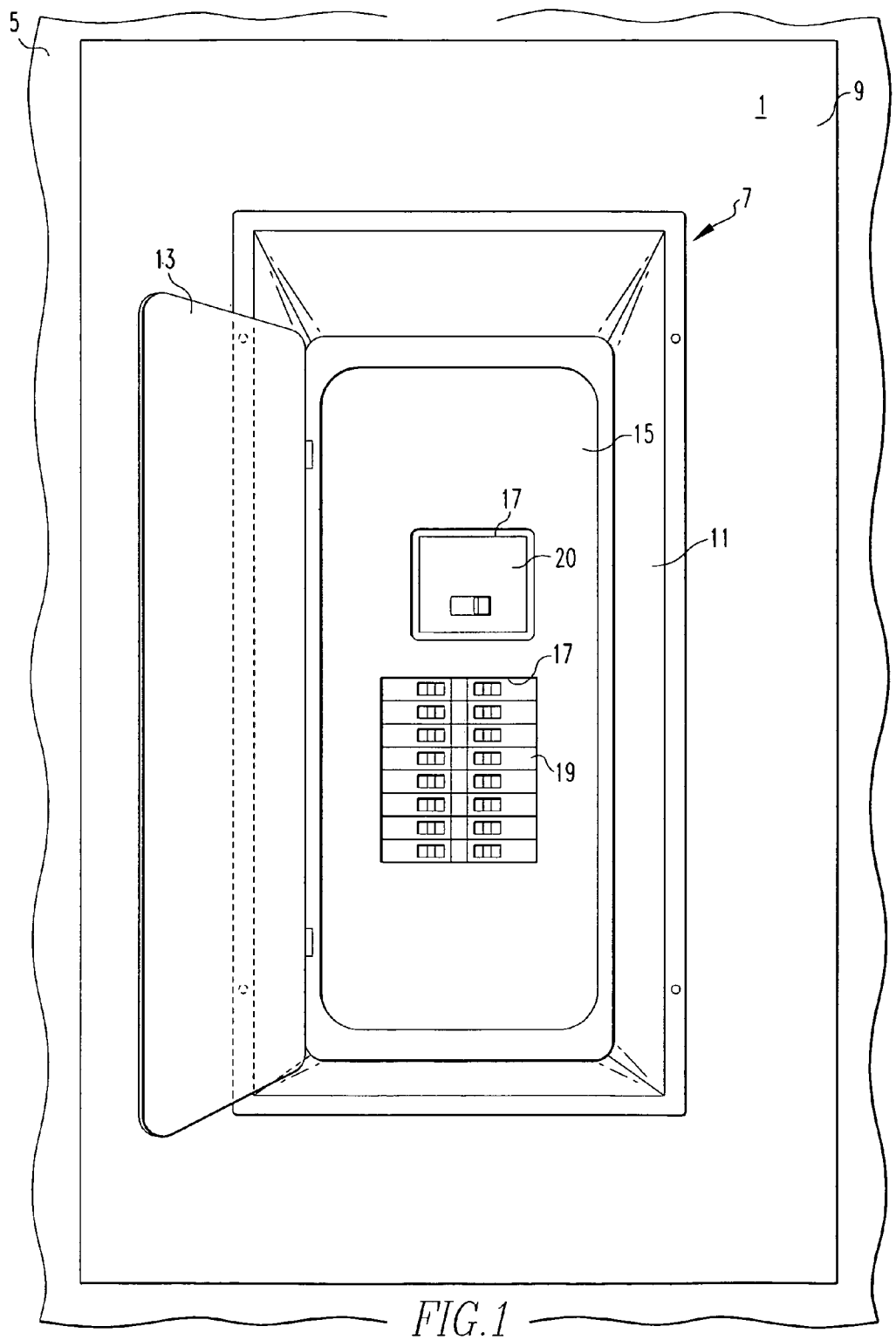
FIG. 1 is a front elevation view of a panel board in accordance with the invention.
Figure 2:
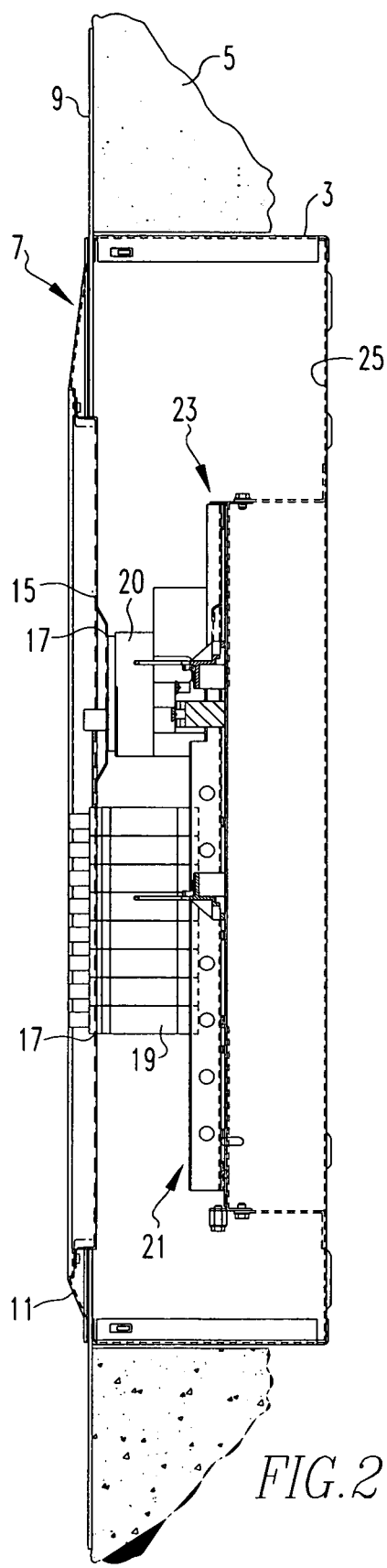
FIG. 2 is a vertical section through the panel board of FIG. 1 taken along the line 2—2.

Referring to FIGS. 1 and 2, the panel board 1 includes an enclosure 3 recessed to be flush with a wall surface 5. A trim assembly 7 is mounted on the front of the enclosure by a picture frame 9. The trim assembly 7 includes a trim piece 11 that supports a hinged door 13 and a dead front 15 accessible through the door. The dead front 15 is a panel member having openings 17 through which the bases of branch circuit breakers 19 and a main breaker 20 protrude.

The circuit breakers 19 are mounted on an interior 21 that is supported in the enclosure 3 by a riser assembly 23. The riser assembly 23 must be dimensioned so that the circuit breakers 19 and 20 are in registration with the dead front openings 17. Original equipment is dimensioned to provide this registration. However, as discussed above, in retrofitting and updating existing panel boards, the replacement circuit breakers and interiors tend to be smaller so that the fixed riser does not provide the proper forward alignment of the circuit breakers 19 and 20 with the openings 17.

Figure 3:
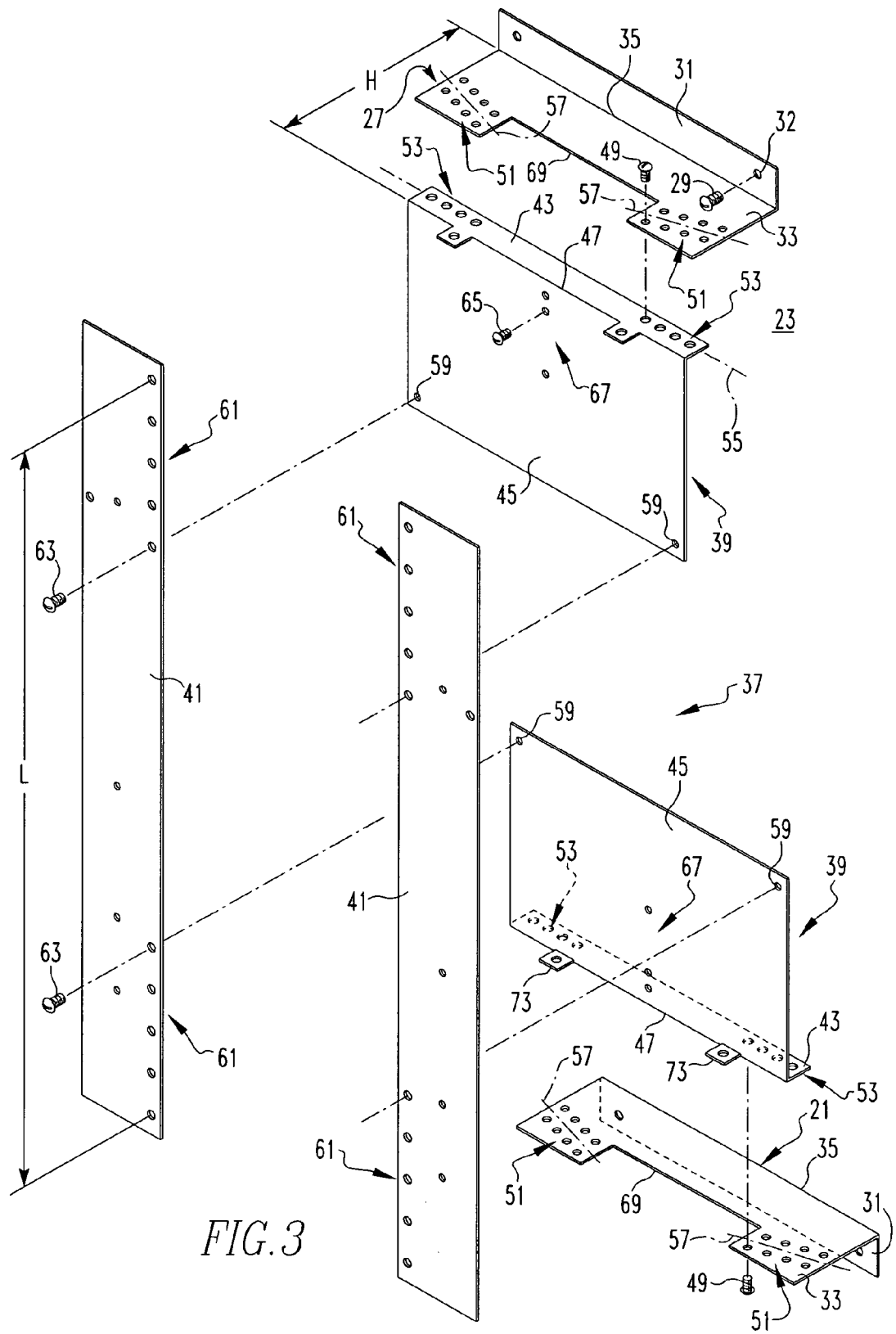
FIG. 3 is an exploded isometric view of a riser assembly which forms part of the panel board of FIGS. 1 and 2.

In order to overcome the problems discussed above in connection with retrofitting existing panel boards, the present invention includes an adjustable riser assembly 23 which is best seen in FIG. 3. The riser assembly 23 is mounted on the rear wall 25 of the enclosure 3. The adjustable rise assembly 23 includes a pair of base members 27 secured to the rear wall 25 by self-tapping screws 29. Each base member 27 has a first flange 31 that is secured flat against the rear wall 25 of the enclosure 3 and a second flange 33 extending perpendicular to the first flange 31 along a common edge 35 to form a base projection.

The riser assembly 23 also includes a floating member 37 formed by a pair of end pieces 39 connected by a pair of planar members 41. Each end piece 39 is formed by a third flange 43 and a fourth flange 45 forming a planar extension extending perpendicular from the third flange along a second common edge 47. The third flange 43 on each end piece 39 overlaps the second flange 33 on the corresponding base member 27 to establish the height "h" of the adjustable riser assembly 23. The selective height is established by fasteners 49 that engage selected ones of a first set of holes 51 on the flange 43 of the end pieces 39 and selected ones of a second set of holes 53 on the flange 33 of the base members 27. The holes 51 are aligned along a first linear axis 55 while the second set of holes 53 are aligned in two rows along second linear axes 57 that are oblique to the first linear axis 55. By selecting appropriate ones of the holes 51 and 53 for the fasteners 49, a range of heights "H" of the riser assembly 23 are provided. By arranging the holes 53 in two parallel rows, incremental adjustment can be made for distances less than the diameter of the holes.

The planar extensions formed by the fourth flanges 45 on the end pieces 39 have at least one hole in a third set of holes 59 and the planar members 41 have a fourth set of holes 61 so that the length "L" of the riser assembly 23 can be adjusted over a range by insertion of second fasteners 63 through the appropriate holes of the third and fourth set of holes 59 and 61, respectively.

The interior 21 is secured to the planar extensions 45 of the end pieces 39 by additional fasteners 65 extending through appropriate of holes 67. Cut-outs 69 in the flanges 33 of the base members 27 provide clearance for the interiors for heights "h" of the riser assembly 23 in the lower end of the range of heights.

Figure 4:
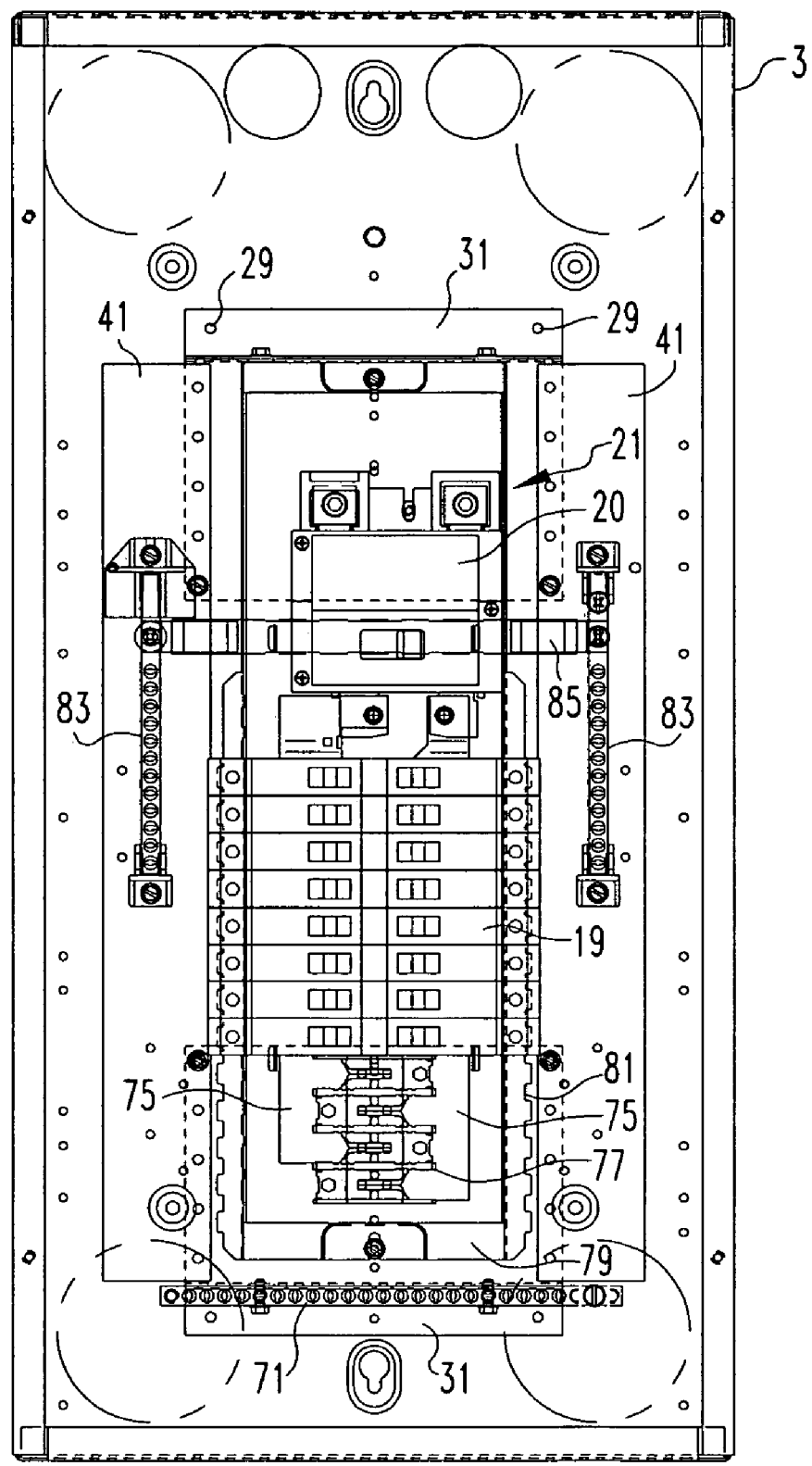
FIG. 4 is a front elevation view of an interior mounted on the riser assembly of FIG. 3.

Turning to FIG. 4, a conventional grounding bar 71 can be secured to tabs 73 on the end pieces 39 (see also FIG. 3). The interior 21 can be conventional with the hot bus(es) 75 mounted by an insulative structure 77 on a pan 79. The buses 75 can be one phase or three phase. The pan 79 has rolled side edges with notches 81 for engaging the branch circuit breakers 19 as is well known. Neutral terminal bars 83 can be secured to each of the planar members 41. The two neutral terminal bars 83 can be joined by a neutral bus 85 that passes under the interior 21.

The adjustable riser assembly of the invention provides a flexible arrangement for retrofitting panel boards using the original enclosure and without the need for precise field measurements. The picture frame 9 is secured in place over the existing enclosure 3. The trim assembly 7 is then mounted inside the picture frame, which in-turn, provides the alignment for securing the adjustable riser assembly 23 to the rear wall of the existing enclosure. The height "h" and length "L" are then fixed to bring the circuit breakers into alignment with the openings 17 in the dead front 15. The adjustable riser assembly of the invention can also be used in new construction panel boards to accommodate for enclosures with a range of depths and/or interiors with a range of lengths.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the claims appended and any and all equivalents thereof.

What is claimed is:

1. A panel board comprising:
   an enclosure having a rear wall and a dead front with circuit breaker openings positioned at a range of depths from the rear wall;
   an interior having a range of lengths;
   circuit breakers mounted on a front of the interior;
   an adjustable riser assembly secured to the rear wall of the enclosure and on which the interior is mounted, the riser assembly having a selected height adjustable to position the circuit breakers in registration in the circuit breaker openings in the dead front over the range of depths of the enclosure; and
   wherein the adjustable riser assembly comprises a pair of spaced apart base members secured to the rear wall of the enclosure each having a base projection extending outward from the rear wall of the enclosure and having a first set of holes, a floating member having a pair of floating projections one at each end projecting toward the rear wall of the enclosure and having a second set of holes, and a plurality of first fasteners, the first and second sets of holes being positioned so that with the base projections and floating projections selectively overlapping, selected holes of the first set of holes and of the second set of holes can be aligned for engagement by the first fasteners to establish the selected height of the riser assembly.

2. The panel board of claim 1, wherein the base members each comprise a first flange secured flat against the rear wall of the enclosure and a second flange comprising the base projection perpendicular to and joined along a first common edge to the first flange.

3. The panel board of claim 2, wherein one of the first and second sets of holes comprise a first plurality of holes aligned along a first linear axis and the other comprises a second plurality of holes aligned along at least one second linear axis that is oblique to the first linear axis.

4. The panel board of claim 3, wherein the other set of holes comprises the second plurality of holes aligned in two rows each aligned parallel to the second linear axis and staggered in the direction of the height of the riser assembly.

5. The panel board of claim 1, wherein the floating member comprises a pair of end pieces each having a third flange forming one of the floating projections, and a planar extension extending substantially perpendicular to and joined along a common second edge to the third flange, at least one planar member extending between the planar extensions on the end pieces, and second fasteners securing the at least one planar member to the end pieces to set the selected length of the riser assembly.

6. The panel board of claim 5, wherein the planar extensions on the end pieces have third sets of holes and the at least one planar member has a fourth set of holes, the at least one planar member selectively overlapping the planar extensions on the end pieces with selected holes of the third set of holes aligned with selected holes of the fourth set of holes for engagement by the second fasteners to set the selected length of the interior.

7. The panel board of claim 6, wherein the at least one planar member comprises a pair of planar members extending between the two end pieces.

8. An adjustable riser assembly for a panel board having an enclosure with a rear wall and a dead front with circuit breaker openings positioned at a range of depths from the rear wall, and an interior having circuit breakers mounted on a front of the interior, said riser assembly comprising:
   a pair of spaced apart base members secured to the rear wall of the enclosure, each having a base projection extending outward from the rear wall of the enclosure and having a first set of holes;
   a floating member having a pair of floating projections, one at each end projecting toward the rear wall of the enclosure and having a second set of holes; and
   a plurality of first fasteners, the first and second sets of holes being positioned so that with the base projections and floating projections selectively overlapping, selected holes of the first sets of holes and of the second sets of holes are aligned for engagement by the first fasteners to establish the selected height of the riser assembly.

9. The adjustable riser assembly of claim 8, wherein the base members each comprise a first flange secured flat against the rear wall of the enclosure and a second flange comprising the base projection perpendicular to and joined along a first common edge to the first flange.

10. The adjustable riser assembly of claim 9, wherein one of the first and second sets of holes comprise a first plurality of holes aligned along a first linear axis and the other comprises a second plurality of holes aligned along at least one second linear axis that is oblique to the first linear axis.

11. The adjustable riser assembly of claim 10, wherein the other sets of holes comprises the second plurality of holes aligned in two rows each aligned parallel to the second linear axis and staggered in the direction of the height of the riser assembly.

12. The adjustable riser assembly of claim 9, wherein the floating member comprises a pair of end pieces each having a third flange forming one of the floating projections, and a planar extension extending substantially perpendicular to and joined along a common second edge to the third flange, at least one planar member extending between the planar extensions on the end pieces, and second fasteners securing the at least one planar member to the end pieces to set the selected length of the riser assembly.

13. The adjustable riser assembly of claim 12, wherein the planar extensions on the end pieces have third sets of holes and the at least one planar member has a fourth set of holes, the at least one planar member selectively overlapping the planar extensions on the end pieces with selected holes of the third sets of holes aligned with selected holes of the fourth set of holes for engagement by the second fasteners to set the selected length of the interior.

14. The adjustable riser assembly of claim 13, wherein the at least planar member comprises a pair of planar members extending between the two end pieces.

15. A panel board comprising:
   an enclosure having a rear wall and a dead front with circuit breaker openings positioned at a range of depths from the rear wall;
   an interior having a range of lengths;
   circuit breakers mounted on a front of the interior;
   an adjustable riser assembly secured to the rear wall of the enclosure and on which the interior is mounted, the riser assembly having a selected height adjustable to position the circuit breakers in registration in the circuit breaker openings in the dead front over the range of depths of the enclosure; and
   wherein the adjustable riser assembly has means for selectively setting the length of the riser assembly to a selected length to accommodate the range of lengths of the interior.

* * * * *